US011682933B2

(12) United States Patent
Fukushima

(10) Patent No.: US 11,682,933 B2
(45) Date of Patent: Jun. 20, 2023

(54) MOTOR AND FAN MOTOR

(71) Applicant: Nidec Corporation, Kyoto (JP)

(72) Inventor: Kazuhiko Fukushima, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 528 days.

(21) Appl. No.: 16/669,640

(22) Filed: Oct. 31, 2019

(65) Prior Publication Data

US 2020/0177035 A1 Jun. 4, 2020

(30) Foreign Application Priority Data

Dec. 3, 2018 (JP) .................... 2018-226803

(51) Int. Cl.
 *H02K 1/20* (2006.01)
 *F04D 29/52* (2006.01)
 (Continued)

(52) U.S. Cl.
 CPC ............. *H02K 1/20* (2013.01); *F04D 19/002* (2013.01); *F04D 25/06* (2013.01);
 (Continued)

(58) Field of Classification Search
 CPC .. F04D 19/002; F04D 25/062; F04D 25/0646; F04D 25/0613; F04D 25/082;
 (Continued)

(56) References Cited

U.S. PATENT DOCUMENTS 5,363,003 A * 11/1994 Harada ................ H02K 5/1675
 310/216.118
6,376,946 B1 * 4/2002 Lee ...................... H02K 5/1675
 310/90

(Continued)

FOREIGN PATENT DOCUMENTS

| CN | 103161744 A | 6/2013 |
|---|---|---|
| CN | 207813998 U | 9/2018 |
| JP | 03-139155 A | 6/1991 |

OTHER PUBLICATIONS

Foreign priority document (i.e. Taiwanese Application No. 092201459) for U.S. Appl. No. 10/680,301 (i.e. Wang US 2004/0145262). US 2004/0145262 is the English language equivalent for Taiwanese Application No. 092201459. (Year: 2004).*

(Continued)

*Primary Examiner* — Devon C Kramer
*Assistant Examiner* — Joseph S. Herrmann
(74) *Attorney, Agent, or Firm* — Keating & Bennett

(57) ABSTRACT

A motor includes a rotor rotatable about a center axis that extends vertically, a stator opposing the rotor in a radial direction, and a base portion opposing a lower surface of the stator in an axial direction. The base portion includes a lower lid portion extending in a direction orthogonal or substantially orthogonal to the center axis, a protruding portion protruding in the axial direction from an upper surface at a center of the lower lid portion, and a stator holding portion adjacent to the protruding portion in the axial direction and contactable with an inner circumferential surface of the stator. The protruding portion includes a first ventilation portion opening downward at the center of the lower lid portion and a second ventilation portion to cause the protruding portion to communicate with the first ventilation portion.

14 Claims, 12 Drawing Sheets

(51) Int. Cl.
  *F04D 19/00* (2006.01)
  *F04D 25/06* (2006.01)
  *H02K 7/08* (2006.01)
  *H02K 7/14* (2006.01)
  *H02K 11/33* (2016.01)
  *H02K 21/22* (2006.01)
  *H02K 1/18* (2006.01)
  *H02K 5/20* (2006.01)

(52) U.S. Cl.
  CPC ....... *F04D 25/0613* (2013.01); *F04D 29/522* (2013.01); *H02K 1/187* (2013.01); *H02K 5/207* (2021.01); *H02K 7/088* (2013.01); *H02K 7/14* (2013.01); *H02K 11/33* (2016.01); *H02K 21/22* (2013.01); *H02K 2211/03* (2013.01)

(58) Field of Classification Search
  CPC ............. F04D 29/5826; F04D 29/5853; F04D 29/5806; H02K 1/187; H02K 1/20; H02K 5/1675; H02K 5/207; H02K 7/14; H02K 7/088; H02K 9/06; H02K 11/33; H02K 21/22; H02K 2211/03
  USPC .......................................................... 310/90
  See application file for complete search history.

(56) References Cited

U.S. PATENT DOCUMENTS

| | | | |
|---|---|---|---|
| 6,617,736 B1* | 9/2003 | Horng | H02K 5/163 310/90 |
| 2004/0145262 A1* | 7/2004 | Wang | H02K 1/187 310/91 |
| 2004/0155544 A1* | 8/2004 | Wang | H02K 1/187 310/91 |
| 2010/0322800 A1* | 12/2010 | Yeh | F04D 25/0646 417/423.7 |
| 2013/0156573 A1 | 6/2013 | Kaji | |
| 2014/0079577 A1* | 3/2014 | Chang | F04D 29/5806 417/423.8 |
| 2018/0177373 A1 | 6/2018 | Hayamitsu | |

OTHER PUBLICATIONS

Official Communication issued in corresponding Chinese Patent Application No. 201911187452.4 dated Aug. 27, 2021.

* cited by examiner

US 11,682,933 B2

MOTOR AND FAN MOTOR

CROSS REFERENCE TO RELATED APPLICATION

The present invention claims priority under 35 U.S.C. § 119 to Japanese Application No. 2018-226803 filed on Dec. 3, 2018, the entire content of which is incorporated herein by reference.

1. FIELD OF THE INVENTION

The present invention relates to a motor and a fan motor.

2. BACKGROUND

A conventional axial blower includes a stator fixed to the outside of a bearing sleeve, and a rotating shaft rotatably supported by an oil-impregnated sintered bearing press-fitted into the inside of the bearing sleeve. A blade having a cup-shaped boss portion is coupled to a distal end of the rotating shaft, and a rotor is fixed to an inner circumferential surface of the boss portion. As the rotor rotates outside the stator, axial air flow is generated.

A recess that becomes deeper toward the intake side and front side in a rotational direction is formed on an outer circumferential surface of the boss portion. Since the recess is provided on the outer circumferential surface of the boss portion, the air flow is adjusted to improve P-Q characteristics of the axial blower.

In recent years, a demand for the axial blower to increase the input and improve the P-Q characteristics has increased. However, the air flows along the outer circumferential surface of the boss portion including the recess, and thus, it is difficult to sufficiently cool the stator that is a heat generation source. Therefore, there is a risk that it is difficult to sufficiently improve the P-Q characteristics or that the life of the bearing or the like is shortened.

SUMMARY

An example embodiment of a motor of the present disclosure includes a rotor supported by a bearing and rotatable about a center axis that extends vertically, a stator opposing the rotor in a radial direction and including a tubular inner circumferential surface, and a base portion opposing a lower surface of the stator in an axial direction. The base portion includes a lower lid portion which expands in a direction orthogonal or substantially orthogonal to the center axis, a protruding portion that protrudes in the axial direction from an upper surface at a center of the lower lid portion, and a stator holding portion which is adjacent to the protruding portion in the axial direction and contacts the inner circumferential surface of the stator. The protruding portion includes a first ventilation portion which includes a lower opening which is open downward at the center of the lower lid portion and extends in the axial direction and a second ventilation portion which communicates with the first ventilation portion in the radial direction.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described in detail with reference to the accompanying drawings. In addition, in the specification, a direction parallel to the center axis C1 of a fan motor A is referred to as an "axial direction", a direction orthogonal to the center axis C1 of the fan motor A is referred to as a "radial direction", and a direction along the arc about the center axis C1 of the fan motor A as the center is referred to as a "circumferential direction". In addition, in the specification, a shape and a positional relationship of each part will be described with the axial direction as the up-down direction in the fan motor A and an intake port 33 side of a housing 30 with respect to an impeller 20 as the upper side. It should be noted, however, that the above definition of the vertical direction and the upper and lower sides is made simply for the sake of convenience in description, and is not meant to restrict relative positions or directions of different members or portions of the fan motor A when in use.

Figure 1:
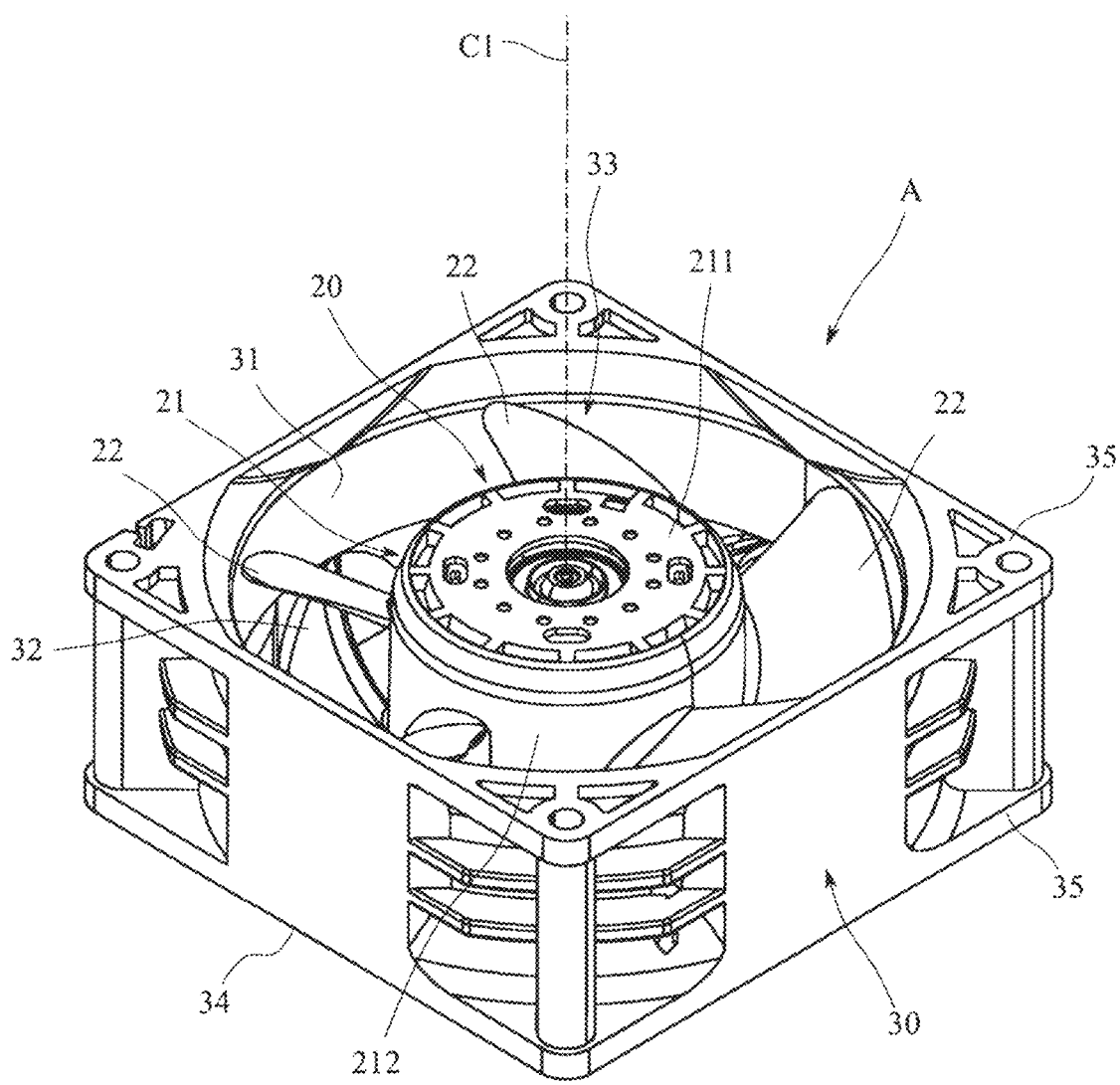
FIG. 1 is a perspective view illustrating an example embodiment of a fan motor according to the present disclosure.
Figure 2:
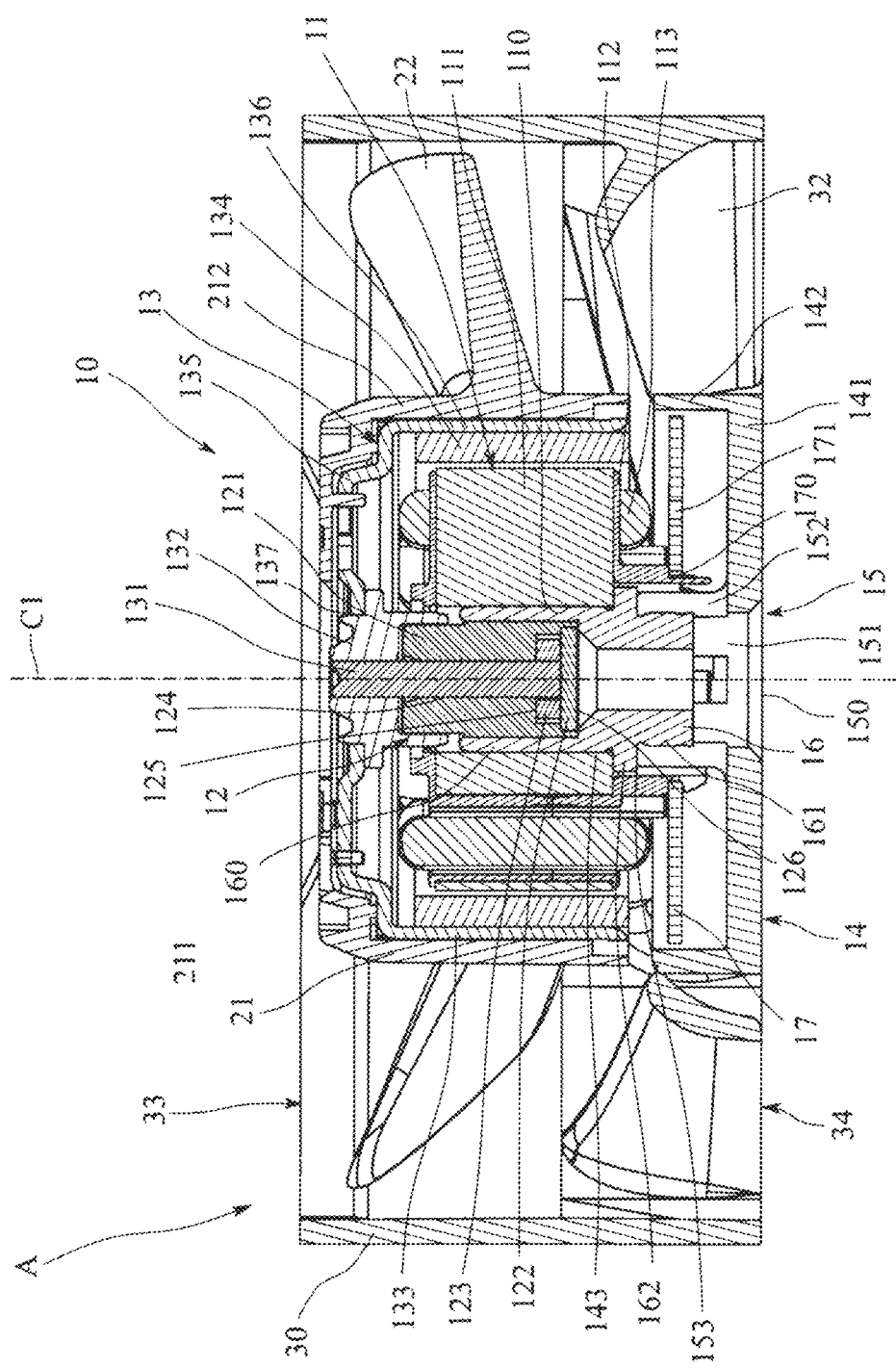
FIG. 2 is a longitudinal cross-sectional view of the fan motor illustrated in FIG. 1.

FIG. 1 is a perspective view illustrating an example of a fan motor A according to the present disclosure. FIG. 2 is a longitudinal cross-sectional view of the fan motor A illustrated in FIG. 1.

As illustrated in FIGS. 1 and 2, the fan motor A according to the example embodiment includes a motor 10, an impeller 20, and a housing 30. The motor 10 and the impeller 20 are arranged inside the housing 30. The impeller 20 is fixed to a rotor 13, which will be described later, of the motor 10 and rotates inside the housing 30 by driving the motor 10. The rotation of the impeller 20 generates axial air flow in a wind tunnel portion 31 of the housing 30. That is, the fan motor A includes: the motor 10; the impeller 20 which is fixed to the rotor 13 and rotates together with the rotor 13; and the housing 30 which houses the motor 10 and the impeller 20.

Figure 3:
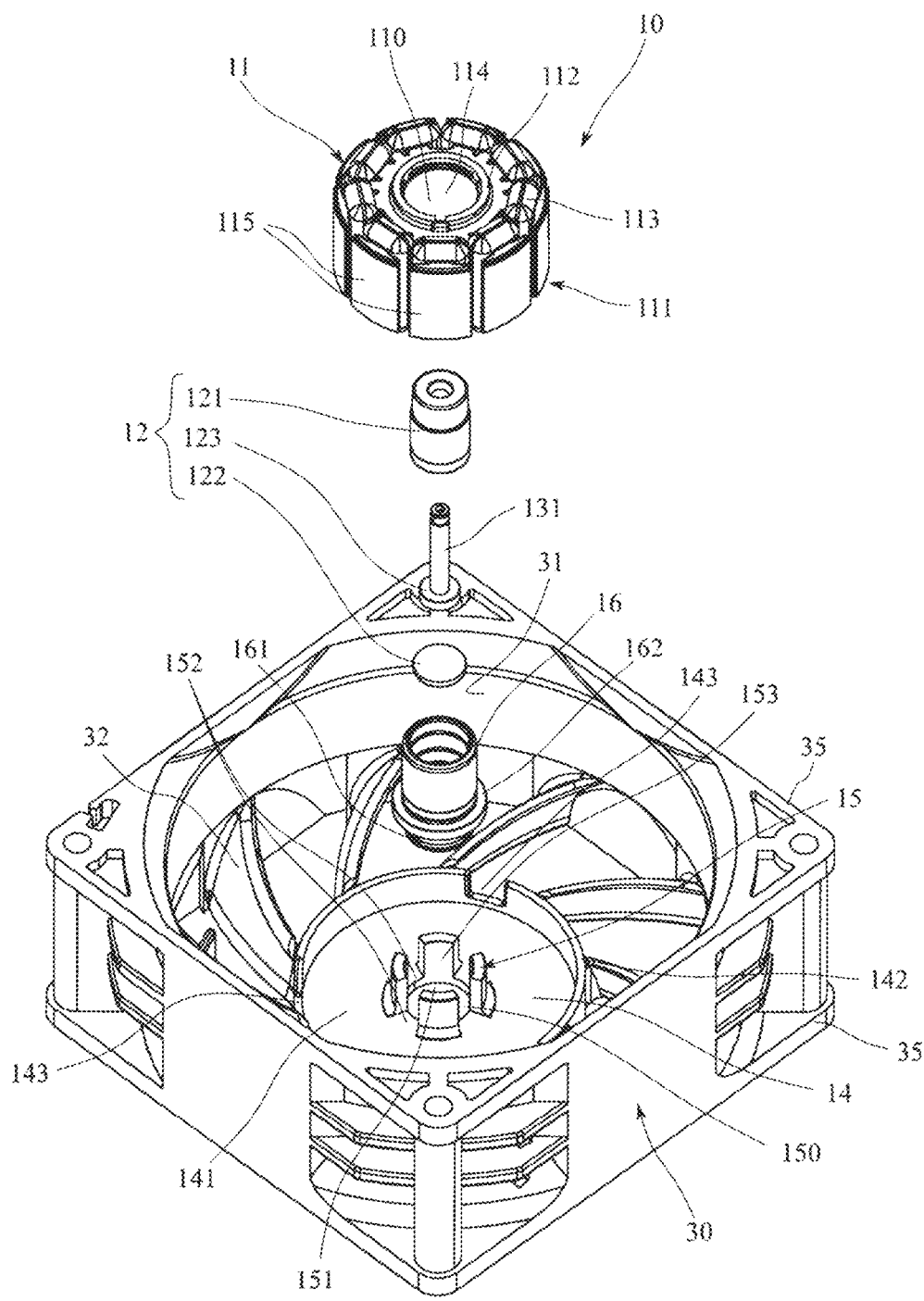
FIG. 3 is an exploded perspective view illustrating an example embodiment in a state where a housing, a stator, a bearing, and a shaft are disassembled.

FIG. 3 is an exploded perspective view illustrating a state in which the housing 30, the stator 11, a bearing 12, and a shaft 131 are disassembled. As illustrated in FIGS. 2 and 3, the motor 10 includes the stator 11, the bearing 12, the rotor 13, and a base portion 14. The motor 10 further includes a circuit board 17 arranged between the base portion 14 and the stator 11 in the axial direction. The shaft 131, which will be described later, is rotatably supported by the bearing 12. Details of each portion will be described hereinafter.

Figure 4:
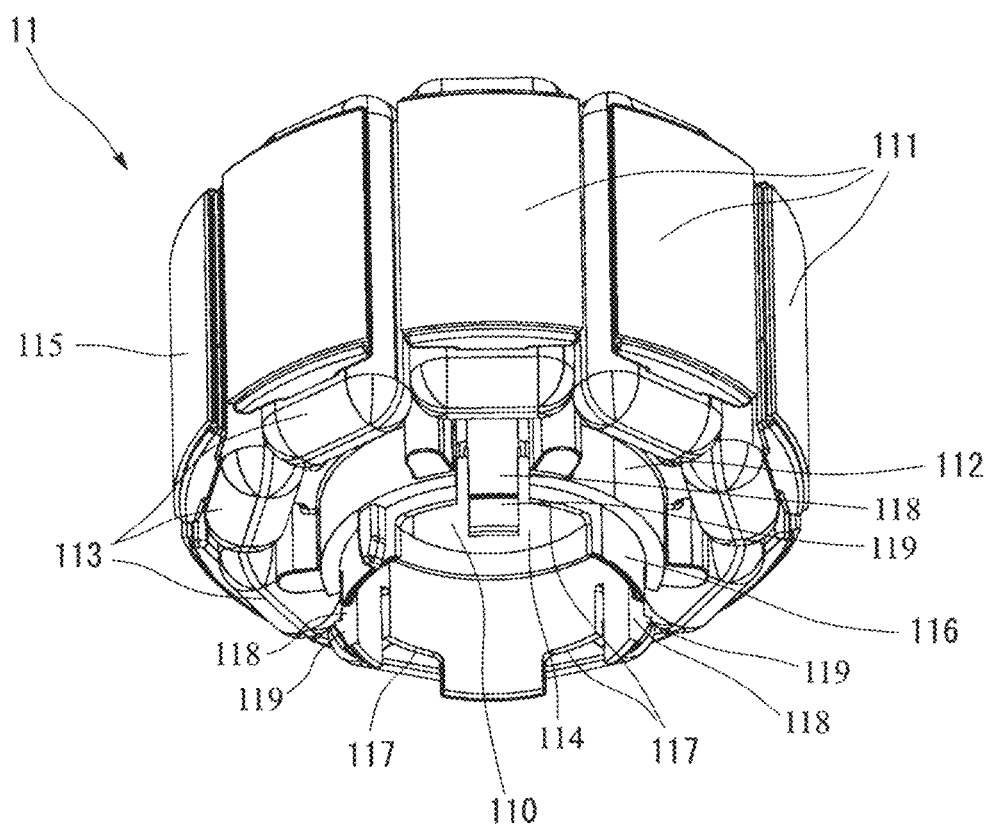
FIG. 4 is a perspective view of the stator as viewed from below.

Details of the stator 11 will be described with reference to a new drawing. FIG. 4 is a perspective view of the stator 11 as viewed from below. As illustrated in FIGS. 3 and 4, the stator 11 includes a stator core 111, an insulator 112, and a coil portion 113.

Figure 5:
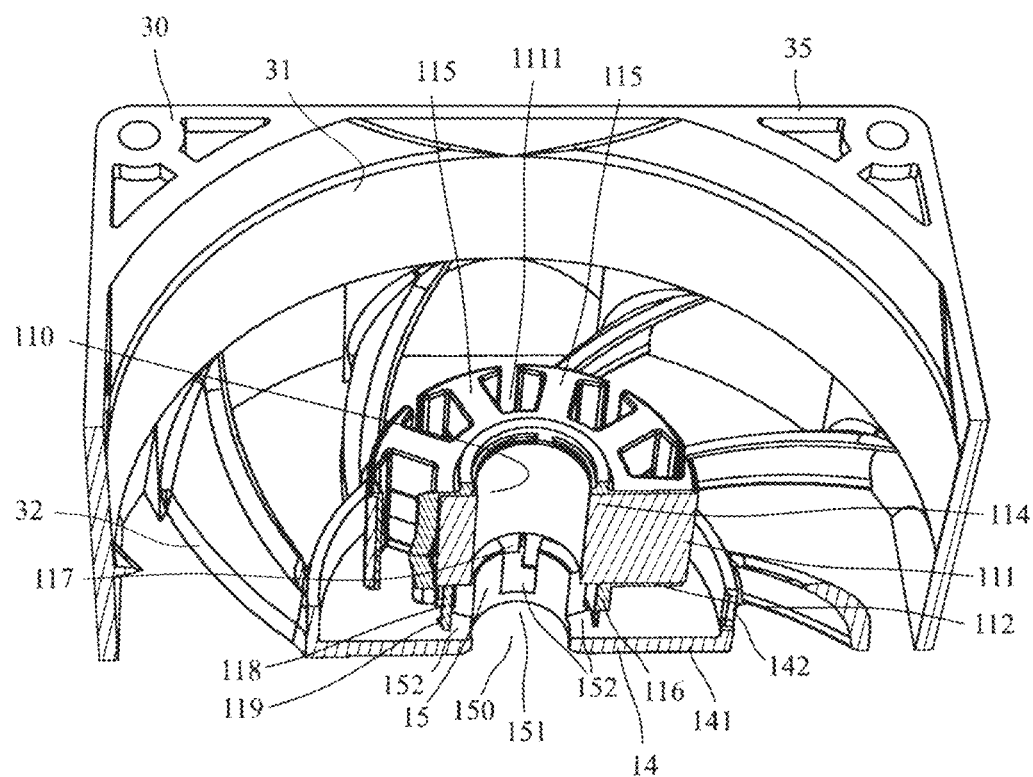
FIG. 5 is a cross-sectional perspective view of the housing in which a stator core is provided.

FIG. 5 is a cross-sectional perspective view of the housing 30 in which the stator core 111 is arranged. FIG. 5 illustrates positions of the housing 30 and the stator core 111, and does not illustrate members other than the housing 30 and the stator core 111. The stator core 111 has thermal conductivity. The stator core 111 may have a structure in which electromagnetic steel plates are laminated or may be a single member formed by powder firing or casting. The stator core 111 faces the rotor 13 in the radial direction. The stator core 111 includes a core back portion 114 and a plurality of (nine, herein) teeth 115. The core back portion 114 has a tubular shape extending in the axial direction and has an inner circumferential surface 110. The teeth 115 protrude radially outward from an outer circumferential surface of the core back portion 114. That is, the stator 11 has the tubular inner circumferential surface 110 and faces the rotor 13 in the radial direction. The stator 11 includes the stator core 111 having the inner circumferential surface 110.

In the stator core 111 illustrated in the example embodiment, the plurality of teeth 115 are arranged at equal intervals in the circumferential direction. A portion between the teeth 115 adjacent to each other in the circumferential direction is a slot 1111 in which a conductor wire constituting the coil portion 113 is arranged. That is, the stator 11 includes the plurality of slots 1111. As illustrated in FIG. 5 and the like, the slots 1111 communicate with each other in the axial direction.

The insulator 112 is a resin-molded body. The insulator 112 covers a part of the stator core 111. That is, the insulator 112 covers at least a part of the stator core 111. The insulator 112 insulates the stator core 111 and the coil portion 113 from each other. The insulator 112 is the resin-molded body in the example embodiment, but is not limited thereto. A configuration that enables insulation between the stator core 111 and the coil portion 113 can be widely adopted.

The insulator 112 includes a cover portion 116. The cover portion 116 comes into contact with an axially lower end of an outer circumferential surface of the core back portion 114. The cover portion 116 has a cylindrical shape that extends in the axial direction. The cover portion 116 faces an outer circumferential surface of a protruding portion 15, which will be described later, in radial direction. That is, the insulator 112 includes the cover portion 116 that faces the outer surface of the protruding portion 15 in the radial direction (see FIG. 2).

The cover portion 116 includes a plurality of through portions 117 which penetrate through the cover portion 116 in the radial direction. As illustrated in FIG. 4, the through portion 117 has a concave shape that is recessed upward from an axially lower end of the cover portion 116. The through portion 117 penetrates through the cover portion 116 in the radial direction. The cover portion 116 includes the three through portions 117. The three through portions 117 are arranged at equal intervals in the circumferential direction. As illustrated in FIG. 5, at least one circumferential position of the through portion 117 overlaps with a circumferential position of a second ventilation portion 152. Accordingly, the cover portion 116 is prevented from blocking the second ventilation portion 152, and flow of air is hardly hindered. As a result, air flow easily flows through a first ventilation portion 151 and the second ventilation portion 152, which will be described later, and cooling by the air flow is efficiently performed.

The cover portion 116 includes a board holding portion 118 that can be elastically deformed. The board holding portion 118 includes a wedge-shaped stopper 119 whose radial width increases toward the axially upper side on a radially outer surface of an axially lower end. The board holding portion 118 has a so-called snap-fit shape. The board holding portion 118 comes into contact with an inner surface of a central through-hole 170, which will be described later, of the circuit board 17. At this time, the stopper 119 supports a lower surface of the circuit board 17. That is, the insulator 112 holds the circuit board 17.

The coil portion 113 is arranged for each of the teeth 115 of the stator core 111. The coil portions 113 are formed by winding a conductor wire around the corresponding tooth 115 covered with the insulator 112. That is, the coil portions 113 as many as the teeth 115 are provided in the stator 11. The conductor wire constituting the coil portion 113 is arranged in the slot 1111.

The plurality of coil portions 113 provided in the stator 11 are divided into three groups (hereinafter referred to as three phases) which differ in timing of supply of an electric current. The three phases are defined as a U phase, a V phase, and a W phase, respectively. That is, the stator 11 includes the same number of U-phase coil portions, V-phase coil portions, and W-phase coil portions. In the following description, the coil portions of the respective phases will be collectively referred to simply as the coil portion 113. The stator 11 configured as described above is fixed to the base portion 14.

Figure 6:
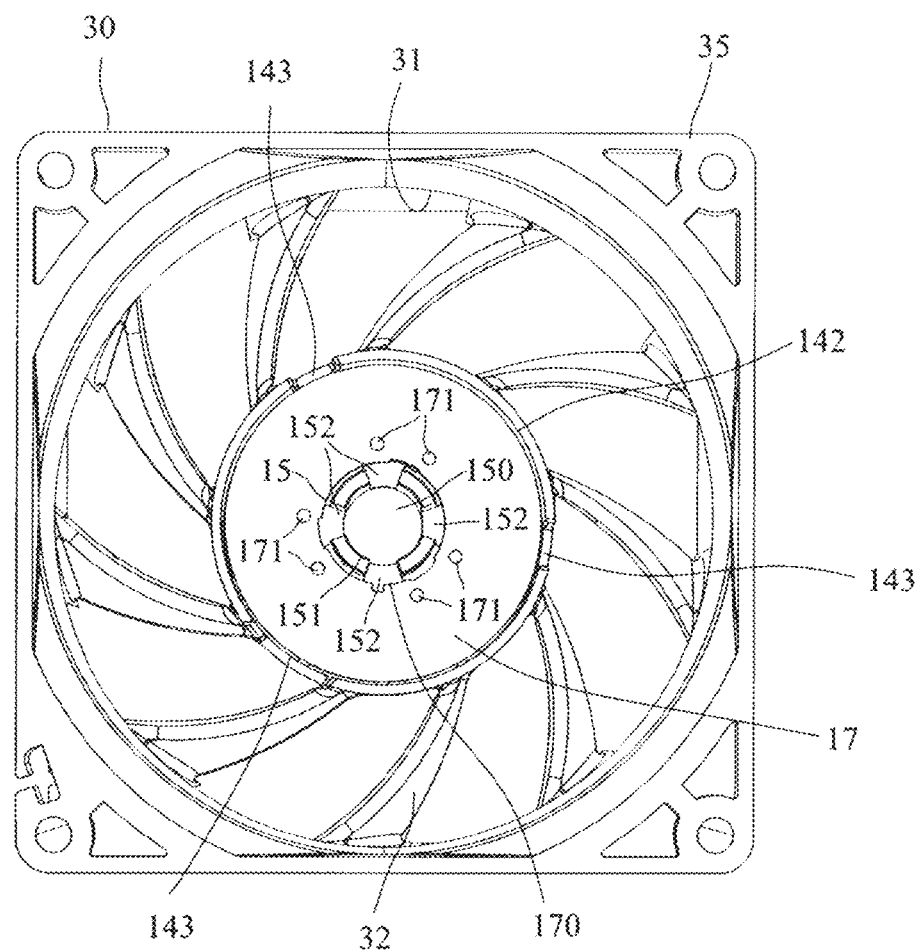
FIG. 6 is a plan view of the housing.

Next, details of the base portion 14 will be described with reference to the drawings. FIG. 6 is a plan view of the housing 30. FIG. 6 illustrates the circuit board 17.

As illustrated in FIGS. 2 and 3, the base portion 14 is arranged on the lower side of the stator 11 and faces a lower end of the stator 11 in the axial direction. That is, the base portion 14 faces a lower surface of the stator 11 in the axial direction. The base portion 14 includes a lower lid portion 141, a protruding portion 15, and a stator holding portion 16. In the base portion 14, the protruding portion 15 and the stator holding portion 16 are separate members. That is, the stator holding portion 16 is the separate member from the protruding portion 15. The base portion 14 further includes an outer wall 142 (see FIGS. 5 and 6). That is, the base portion 14 further includes the outer wall 142 that extends axially upward from a radially outer edge of the lower lid portion 141. The base portion 14 is formed using the same material as a stationary blade 32, which will be described later, of the housing 30. That is, the base portion 14 is a member constituting the motor 10 and is also a part of the housing 30.

The lower lid portion 141 is circular as viewed from the axial direction. That is, the lower lid portion 141 has a disk shape. That is, the base portion 14 includes the lower lid portion 141 that expands in a direction orthogonal to a center axis C1. The lower lid portion 141 has the disk shape in the example embodiment, but is not limited thereto. For example, the lower lid portion 141 may have a polygonal shape, such as a quadrilateral and a hexagon or an elliptical shape as viewed in the axial direction. A wide variety of shapes may be adopted for the lower lid portion 141 in accordance with a device to which the motor 10 is to be attached. The protruding portion 15 that protrudes axially upward from an upper surface is provided at the center of the lower lid portion 141. That is, the protruding portion 15 that protrudes in the axial direction from the upper surface is provided at the center of the lower lid portion 141.

The outer wall 142 extends axially upward from the radially outer edge of the lower lid portion 141. The outer wall 142 is connected to the stationary blade 32. The outer wall 142 serves as a reinforcing member for the lower lid portion 141. The outer wall 142 suppresses deformation, such as warpage and an inclination, of the lower lid portion 141.

As illustrated in FIGS. 5 and 6, the outer wall 142 includes three outer wall recesses 143 that are recessed from an upper end to the axially lower side. The outer wall recesses 143 are arranged to be spaced apart in the circumferential direction. One circumferential position of the outer wall recess 143 overlaps with one circumferential position of the second ventilation portion 152, which will be described later, of the protruding portion 15 (see FIG. 6). Circumferential positions of two or more outer wall recesses 143 may overlap with the second ventilation portions 152, respectively.

The protruding portion 15 includes the first ventilation portion 151 and the second ventilation portion 152. The first ventilation portion 151 is provided inside the protruding portion 15. The first ventilation portion 151 is provided at the center of the lower lid portion 141 and extends in the axial direction. A lower end of the first ventilation portion 151 has a lower opening 150 that opens the lower lid portion 141 in the axial direction. That is, the protruding portion 15 includes the first ventilation portion 151 that is open downward at the center. Further, an upper end of the first ventilation portion 151 has an upper opening 153. That is, the protruding portion 15 includes the upper opening 153 that extends in the axial direction and is open upward at the upper end.

As described above, the impeller 20 is an axial flow fan in the fan motor A. In the motor 10 that drives the axial flow fan, a force other than an axial force acting on the shaft 131 is small, and the center axis C1 is not easily shaken. Therefore, the shaft 131 can be shortened. Since the bearing 12 is short, an axial length of a sleeve 121 can be shortened. Therefore, a space is formed below the shaft 131 in the motor 10. In the motor 10, the protruding portion 15 including the first ventilation portion 151 and the second ventilation portion 152 is formed in the space. That is, the motor 10 includes the protruding portion 15 including the first ventilation portion 151 and the second ventilation portion 152 since the impeller 20 is an axial flow fan and the shaft 131 is formed to be short.

An insertion portion 161, which will be described later, of the stator holding portion 16 is inserted into the upper opening 153. As illustrated in FIGS. 2 and 3, the protruding portion 15 has a configuration penetrating from the upper end toward the lower end. However, the configuration is not limited thereto. For example, a wall for vertical division may be provided at an intermediate portion in the axial direction of the protruding portion 15.

The second ventilation portion 152 has a concave shape that is recessed axially downward from the upper end of the protruding portion 15. The second ventilation portion 152 is open upward in the axial direction. As will be described later, the base portion 14 including the protruding portion 15 is formed by integral molding with the housing 30 using resin. At this time, it is easy to perform molding in the case of molding using a mold since the second ventilation portion is open axially upward. As illustrated in FIGS. 2 and 3, the second ventilation portion 152 penetrates the protruding portion 15 from an outer surface to an inner surface in the radial direction. Therefore, the second ventilation portion 152 communicates with the first ventilation portion 151. In other words, the second ventilation portion 152 that causes the radially outer side of the protruding portion 15 to communicate with the first ventilation portion 151 is provided. As illustrated in FIG. 6, the protruding portion 15 is provided with four second ventilation portions 152. The four second ventilation portions 152 are arranged at equal intervals in the circumferential direction, but the intervals are not necessarily equal. Further, the number of the second ventilation portions 152 may be three, or five or more.

The stator holding portion 16 is provided at the upper end of the protruding portion 15. The stator holding portion 16 is formed using a material having high thermal conductivity such as metal. The stator holding portion 16 holds the stator 11. That is, the base portion 14 includes the stator holding portion 16 that is adjacent to the protruding portion 15 in the axial direction and comes into contact with the inner circumferential surface 110 of the stator 11. The stator holding portion 16 has a tubular shape extending in the axial direction. The stator holding portion 16 is formed using a heat conductor. Examples of the heat conductor can include iron, aluminum, and the like. The stator holding portion 16 includes a holding tubular portion 160, the insertion portion 161, and a flange portion 162.

The insertion portion 161 is provided at the lower part of the stator holding portion 16. The insertion portion 161 has a cylindrical shape. The insertion portion 161 is inserted from the upper opening 153 of the protruding portion 15. That is, the stator holding portion 16 includes the insertion portion 161 that is inserted from the upper opening 153 at a lower end. More specifically, the insertion portion 161 of the stator holding portion 16 to which the sleeve 121 and the stator core 111, which will be described later, are fixed is inserted from the upper opening 153 of the protruding portion 15. An outer circumferential surface of the insertion portion 161 comes into contact with an inner circumferential surface of the protruding portion 15 so that the stator holding portion 16 is fixed to the protruding portion 15. The fixing of the stator holding portion 16 to the protruding portion 15 is performed by press-fitting, for example. However, the fixing is not limited thereto. In addition to the press-fitting, methods that can firmly fix the stator holding portion 16 to the protruding portion 15, such as adhesion and screwing, can be widely adopted.

The flange portion 162 expands radially outward from an outer circumferential surface of the stator holding portion 16. As illustrated in FIG. 3, an outer diameter of the flange portion 162 is larger than that of the insertion portion 161. Therefore, when the insertion portion 161 is inserted from the upper opening 153 of the protruding portion 15, the flange portion 162 comes into contact with an upper end surface of the protruding portion 15. Accordingly, a position of the stator holding portion 16 in the axial direction is determined.

As illustrated in FIG. 2, a length of the insertion portion 161 in the axial direction is shorter than a length of the protruding portion 15 in the axial direction. When the stator holding portion 16 is fixed to the protruding portion 15, a lower end of the second ventilation portion 152 is arranged below a lower end of the stator holding portion 16. That is, a lower end of the insertion portion 161 is positioned above the axially lower end of the second ventilation portion 152.

Accordingly, the second ventilation portion 152 is not blocked by the stator holding portion 16. As a result, the outer surface of the protruding portion 15 and the first ventilation portion 151 communicate with each other through the second ventilation portion 152. That is, air flow passes through the second ventilation portion 152 from the outside of the protruding portion 15 and easily flows to the first ventilation portion 151 or vice versa.

The holding tubular portion 160 is provided at the upper part of the stator holding portion 16. The holding tubular portion 160 has a cylindrical shape. The stator core 111 is fixed to the outside of the holding tubular portion 160. The holding tubular portion 160 is inserted into the annular core back portion 114. An outer circumferential surface of the holding tubular portion 160 comes into contact with the core back portion 114, that is, the inner circumferential surface 110 of the stator core 111 to hold the stator core 111. Accordingly, the stator holding portion 16 holds the stator 11.

The sleeve 121, which will be described later, of the bearing 12 is fixed inside the holding tubular portion 160. The shaft 131 is rotatably supported by the sleeve 121. For the fixing of the sleeve 121, fixing methods that can firmly fix the sleeve 121 to the holding tubular portion 160, such as press-fitting, adhesion, and welding, can be widely adopted.

The stator 11 is attached to the base portion 14 by fixing the stator core 111 to the outside of the holding tubular portion 160 of the stator holding portion 16 fixed to the protruding portion 15. Further, the bearing 12 is fixed inside the holding tubular portion 160 of the stator holding portion 16. Accordingly, the shaft 131 is rotatably supported by the base portion 14.

As illustrated in FIG. 5, when the stator core 111 is fixed to the base portion 14, at least one circumferential position of the slot 1111 overlaps with the second ventilation portion 152. That is, at least one circumferential position of the plurality of slots 1111 overlaps with the circumferential position of the second ventilation portion 152 as viewed in the axial direction.

The bearing 12 rotatably supports the shaft 131. The bearing 12 is a fluid dynamic bearing (FDB) that supports the rotating shaft 131 with a pressure (dynamic pressure) of a lubricating fluid. As illustrated in FIGS. 2 and 3, the bearing 12 includes the sleeve 121, a thrust cover 122, and a thrust plate 123.

As illustrated in FIGS. 2 and 3, the sleeve 121 has a tubular shape extending in the axial direction. For example, the sleeve 121 can be made of metal, but is not limited thereto. The sleeve 121 includes a bearing through-hole 124, a thrust recess 125, and a seal recess 126. The bearing through-hole 124 is a hole penetrating therethrough in the axial direction. The shaft 131 passes through the bearing through-hole 124. In the bearing 12, the lubricating fluid is interposed between the sleeve 121 and the shaft 131.

On an inner surface of the bearing through-hole 124 of the sleeve 121 or an outer surface of the shaft 131, a radial dynamic pressure generation groove (not illustrated) is formed. When the shaft 131 rotates, a radial dynamic pressure is generated in the lubricating fluid by the radial dynamic pressure generation groove. The shaft 131 is rotatably supported by the radial dynamic pressure generated by the lubricating fluid. That is, a portion of the bearing 12 where the radial dynamic pressure is generated constitutes a radial bearing portion that rotatably supports the shaft 131.

In order to stabilize a rotational center of the shaft 131, the radial dynamic pressure generation groove is provided at two or more locations spaced apart in the axial direction. In the example embodiment, the radial dynamic pressure generation groove is provided on the inner surface of the bearing through-hole 124 of the sleeve 121.

As illustrated in FIG. 2, both the thrust recess 125 and the seal recess 126 are provided at an axially lower end of the sleeve 121. Both the thrust recess 125 and the seal recess 126 have a cylindrical shape. An inner diameter of the thrust recess 125 is smaller than an inner diameter of the seal recess 126 and larger than an inner diameter of the bearing through-hole 124. The seal recess 126 is provided at the lower end of the sleeve 121, and the thrust recess 125 is provided to be adjacent to the upper side of the seal recess 126. Central axes of the thrust recess 125 and the seal recess 126 coincide with a center axis of the bearing through-hole 124. That is, the bearing through-hole 124, the thrust recess 125, and the seal recess 126 are formed continuously in the axial direction.

The thrust plate 123 has an annular shape. The thrust plate 123 has a through-hole at the center. The axially lower end of the shaft 131 is fixed to the through-hole of the thrust plate 123. When the shaft 131 is inserted into the bearing through-hole 124, the thrust plate 123 is inserted into the thrust recess 125. Accordingly, the shaft 131 is prevented from coming off. The thrust recess 125 is filled with the lubricating fluid. Therefore, the lubricating fluid is interposed between the thrust plate 123 and the thrust recess 125. The thrust dynamic pressure generation groove (not illustrated) is provided on one of axially opposing surfaces of the thrust plate 123 and the thrust recess 125.

When the shaft 131 rotates, a thrust dynamic pressure is generated in the lubricating fluid by the thrust dynamic pressure generation groove. The shaft 131 is supported in the axial direction by the thrust dynamic pressure generated by the lubricating fluid. In the example embodiment, the thrust recess 125 is provided with the thrust dynamic pressure generation groove.

The thrust cover 122 has a disk shape. The thrust cover 122 is fixed to the seal recess 126. The thrust cover 122 is fixed to the seal recess 126 by, for example, press-fitting. However, the fixing is not limited thereto, and adhesion, welding, or the like may be used. Fixing methods that can suppress a leakage of the lubricating fluid from a gap between the thrust cover 122 and the seal recess 126 can be widely adopted. The thrust dynamic pressure generation groove (not illustrated) may be formed on one of the opposing surfaces of the thrust cover 122 and the thrust plate 123.

The thrust dynamic pressure generation groove may be determined based on a force acting on the shaft. For example, air flow is generated downward by the rotation of the impeller 20 in the fan motor A of the example embodiment. At this time, an axially upward force acts on the shaft 131 as a reaction. Therefore, at least the thrust dynamic pressure generation groove that generates the thrust dynamic pressure in the lubricating fluid between the thrust plate 123 and the thrust recess 125 is formed. Both the thrust dynamic pressure generation grooves described above may be formed in order to stabilize the axial position of the shaft without being limited to the above-described use method of the motor 10. The portion where the thrust dynamic pressure is generated forms a thrust bearing portion that supports the shaft 131 in the axial direction.

The sleeve 121 to which the shaft 131, the thrust plate 123, and the thrust cover 122 are attached is fixed inside the holding tubular portion 160. The fixing of the sleeve 121 is performed by press-fitting, for example, but is not limited thereto. For example, adhesion, welding, deposition, or the like may be used. Methods that can fix the center of the sleeve 121 so as to coincide with the center of the stator holding portion 16 can be widely adopted. As the sleeve 121 is fixed to the stator holding portion 16, the sleeve 121 and the shaft 131 inserted into the sleeve 121 are arranged at an accurate position with respect to the stator 11. As a result, the center of the stator core 111 and the center of the shaft 131 coincide with each other on the center axis C1.

The rotor 13 rotates about the center axis C1. In other words, the rotor 13 is supported by the bearing 12 and is rotatable about the center axis C1 that vertically extends. The rotor 13 includes the shaft 131, a rotor hub 132, a rotor housing 133, and a magnet 134. The rotor 13 is rotationally driven by the stator 11.

The shaft 131 has a cylindrical shape. The thrust plate 123 is fixed to a lower end of the shaft 131. The shaft 131 is rotatably inserted into the bearing through-hole 124 of the sleeve 121.

The rotor hub 132 is attached to an upper end of the shaft 131. The shaft 131 penetrates through the rotor hub 132 and is fixed in the rotor 13. Examples of the fixing method can include press-fitting, adhesion, and screwing, but are not limited thereto. The shaft 131 penetrates through the rotor hub 132, but does not necessarily penetrate therethrough as long as the shaft 131 can be firmly fixed to the rotor hub 132.

The rotor housing 133 includes a rotor lid portion 135 and a rotor tubular portion 136. The rotor lid portion 135 expands in the radial direction from a center axis. The rotor tubular portion 136 has a tubular shape that extends axially downward from a radially outer end of the rotor lid portion 135. The magnet 134 has a cylindrical shape. The magnet 134 is fixed to an inner circumferential surface of the rotor tubular portion 136. The magnet 134 is fixed to the rotor tubular portion 136 by, for example, press-fitting. However, the fixing is not limited thereto, and examples of the fixing can include fixing by adhesion, fixing using a fixing tool such as a screw, caulking, and the like. Fixing methods in which the magnet 134 and the rotor tubular portion 136 are not easily displaced can be widely adopted.

The rotor lid portion 135 includes a rotor through-hole 137 that penetrates therethrough in the axial direction at the center. The rotor hub 132 penetrates through the rotor through-hole 137. The rotor hub 132 is fixed to the rotor lid portion 135. Accordingly, the shaft 131 and the rotor housing 133 are fixed via the rotor hub 132. The rotor hub 132 and the magnet 134 rotate together with the shaft 131.

The magnet 134 has a tubular shape in which an N pole and an S pole are alternately arranged in the circumferential direction. For example, the magnet 134 may be molded integrally with resin mixed with magnetic powder, or may be formed by arranging a plurality of magnets in the circumferential direction and fixing the magnets with resin or the like. Examples of a fixing method for fixing the magnet 134 to the rotor housing 133 can include press-fitting and adhesion, but are not limited thereto. Methods that can firmly fix the magnet 134 to the rotor housing 133 can be widely adopted.

The rotor tubular portion 136 and the magnet 134 are arranged on the outer side of the radially outer edge of the stator core 111. More specifically, the magnet 134 faces an outer edge of the tooth 115 of the stator core 111 in the radial direction. That is, the motor 10 is an outer rotor type.

The circuit board 17 has a disk shape. The circuit board 17 includes a central through-hole 170 at the center. On the circuit board 17, electronic components necessary for driving the motor 10 are mounted. The protruding portion 15 penetrates through the center of the circuit board 17. In the circuit board 17, a side edge of the central through-hole 170 is held by the board holding portion 118. Accordingly, the circuit board 17 is arranged between the stator 11 and the base portion 14 in the axial direction.

As illustrated in FIG. 6, the circuit board 17 is provided with a plurality of (here, six) board holes 171 penetrating through the circuit board 17 in the axial direction. That is, the circuit board 17 includes the plurality of board holes 171 penetrating through the circuit board 17 in the axial direction. Further, the board hole 171 is arranged to avoid the electronic components (not illustrated) to be mounted. Among the six board holes 171, circumferential positions of the two board holes 171 overlap with the circumferential position of the second ventilation portion 152, but the present disclosure is not limited thereto. It suffices that at least one circumferential position of the plurality of board holes 171 overlaps with the circumferential position of the second ventilation portion 152. That is, at least one circumferential position of the board holes 171 overlaps with the circumferential position of the second ventilation portion 152.

As illustrated in FIGS. 2 and 6, a radially outer edge of the circuit board 17 is arranged on the inner side of the outer wall 142. The outer wall recess 143 forms a gap between the radially outer edge of the circuit board 17 and the outer wall 142. A circumferential position of the outer wall recess 143 overlaps with the circumferential position of the second ventilation portion 152. That is, a radial gap is formed at least in a part between the radially outer edge of the circuit board 17 and the outer wall 142. Therefore, at least a part of the circumferential position of the gap between the radially outer edge of the circuit board 17 and the outer wall 142 overlaps with the circumferential position of the second ventilation portion 152. That is, the circumferential position of at least a part of the radial gap overlaps with the circumferential position of the second ventilation portion 152. The outer wall recess 143 is the recess that is recessed downward from the upper end of the outer wall 142 in the example embodiment, but is not limited thereto. For example, a recess that is recessed radially outward from an inner circumferential surface of the outer wall 142 may be configured. Even when the outer wall recess is formed on the radially inner circumferential surface, a radial gap is formed between the radially outer edge of the circuit board 17 and the outer wall 142.

As illustrated in FIGS. 1 and 2, the impeller 20 includes an impeller hub 21 and a plurality of blades 22. The impeller 20 is a resin injection-molded body. The impeller 20 is an axial flow fan that generates air flow in the axial direction.

The impeller hub 21 includes a hub top plate portion 211 and a hub tubular portion 212. The hub top plate portion 211 has a disk shape expanding in the radial direction. The hub tubular portion 212 is arranged to extend axially downward from a radially outer edge of the hub top plate portion 211. The impeller hub 21 is fixed to the outside of the rotor housing 133. The hub top plate portion 211 is fixed in contact with an upper surface of the rotor lid portion 135. The hub top plate portion 211 includes a boss (not illustrated) that protrudes axially downward from a lower surface. The impeller hub 21 is positioned in the circumferential direction with respect to the rotor housing 133 by inserting the boss into a hole (not illustrated) formed in the rotor lid portion 135.

The hub tubular portion 212 is in contact with an outer circumferential surface of the rotor tubular portion 136. The impeller hub 21 and the rotor hub 132 may be fixed only by fixing the rotor lid portion 135 and the hub top plate portion 211, or by additionally fixing the rotor tubular portion 136 and the hub tubular portion 212. Accordingly, the impeller hub 21 and the rotor hub 132 can be more firmly fixed. In the fan motor A of the example embodiment, an axially lower end surface of the hub tubular portion 212 faces an upper end surface of the outer wall 142 of the base portion 14 in the axial direction. A gap is formed between the hub tubular portion 212 and the outer wall 142.

The plurality of blades 22 are arranged on an outer circumferential surface of the impeller hub 21. The plurality of blades 22 are arranged in the circumferential direction. In the fan motor A of the example embodiment, the blades 22 are arranged on the outer surface of the impeller hub 21 at equal intervals. The blades 22 are integrally formed with the impeller hub 21. An upper part of the blade 22 is arranged forward in a rotation direction with respect to a lower part.

As illustrated in FIGS. 1 to 3, the housing 30 includes the wind tunnel portion 31, the stationary blade 32, and a flange portion 35. The housing 30 is an integrally molded body of resin. The above-described base portion 14 may be formed as an integrally molded body with the housing 30. That is, the base portion 14 is a constituent member of the motor 10 and a part of the housing 30.

The wind tunnel portion 31 is arranged on the radially outer side of the impeller 20 and has a tubular shape extending in the axial direction. The wind tunnel portion 31 has a tubular inner circumferential surface extending along the center axis C1. The impeller 20 rotates inside the wind tunnel portion 31. The wind tunnel portion 31 is a guide that guides air flow generated by the rotation of the impeller 20 along the center axis C1. For example, the impeller 20 rotates to generate air flow in the axial direction and generate air flow to the radially outer side. The wind tunnel portion 31 converts the radially outward air flow generated by the rotation of the impeller 20 into the axial direction.

An axially upper end of the wind tunnel portion 31 is the intake port 33, and an axially lower end thereof is an exhaust port 34. That is, air is sucked from the intake port 33 by the rotation of the impeller 20 in the fan motor A. Then, the air flow accelerated or (and) pressurized by the impeller 20 is discharged from the exhaust port 34.

The flange portion 35 expands radially outward from each of both the axial ends of the wind tunnel portion 31. The flange portion 35 is fixed to a device to which the fan motor A is attached. As the flange portion 35 is fixed to the device, the fan motor A is fixed to the device. When fixing the flange portion 35 to the device, a fixing tool, such as a screw and a snap fit, is used, for example. The fixing method is not limited thereto, and the fixing may be performed by a fixing method such as adhesion and welding. It is preferable to adopt a fixing method that facilitates attachment and detachment when performing maintenance, replacement, or the like.

As illustrated in FIG. 3, the flange portion 35 has a square shape in a plan view, but may have a polygonal shape such as a circular shape, a rectangular shape, and a hexagonal shape. A shape that matches a shape of an attachment position of the device to which the fan motor A is attached can be adopted.

As described above, the base portion 14 is integrated with the housing 30. The base portion 14 is arranged at the lower end of the wind tunnel portion 31 in the axial direction, that is, at the exhaust port 34. The base portion 14 is arranged at the center of the wind tunnel portion 31 in the radial direction. The plurality of stationary blades 32 are arranged between the base portion 14 and the wind tunnel portion 31. That is, the plurality of stationary blades 32 connect the base portion 14 and the wind tunnel portion 31. In the housing 30, the plurality of stationary blades 32 are arranged at equal intervals in the circumferential direction.

The stationary blade 32 is displaced between the upper side and the lower side in the circumferential direction. The stationary blade 32 is arranged below the impeller 20 in the wind tunnel portion 31. Therefore, the air flow generated by the impeller 20 passes through the stationary blade 32. The stationary blade 32 converts a circumferential component of the air flow generated by the impeller 20 into the direction along the axis. That is, the stationary blade 32 rectifies the air flow generated by the rotation of the impeller 20 into air flow directed in the axial direction.

The fan motor A of the example embodiment has the configuration described above. Next, an operation of the fan motor A will be described. In the fan motor A, a torque is generated in the rotor 13 by supplying electric power to the coil portion 113. The shaft 131 of the rotor 13 is rotatably supported by the radial bearing portion of the bearing 12. Therefore, the rotor 13 rotates about the shaft 131, that is, the center axis C1.

Accordingly, the impeller 20 fixed to the rotor housing 133 also rotates about the center axis C1. As a result, air flow is generated from the upper side to the lower side in the axial direction in the wind tunnel portion 31. In other words, the air sucked from the intake port 33 is accelerated or (and) pressurized by the impeller 20 and discharged from the exhaust port 34. The air flow is rectified into the axial direction by the stationary blade 32.

With the rotation of the impeller 20, a force toward the axially upward side acts on the impeller 20. The axial force acting on the impeller 20 acts on the shaft 131. The shaft 131 is supported in the axial direction by the thrust bearing portion of the bearing 12.

In the protruding portion 15, the second ventilation portion 152 penetrates through the protruding portion 15 in the radial direction. The second ventilation portion 152 communicates with the first ventilation portion 151 in the radial direction. Therefore, the outer surface of the protruding portion 15 and the first ventilation portion 151 communicate with each other through the second ventilation portion 152. Then, air flow flows from the outside of the protruding portion 15 to the first ventilation portion 151 through the second ventilation portion 152. Conversely, air flow flows from the first ventilation portion 151 to the outside of the protruding portion 15 through the second ventilation portion 152.

The direction in which air flow flows is determined by a pressure difference between the outside of the protruding portion and the first ventilation portion 151. When the pressure outside the protruding portion 15 is higher than the pressure of the first ventilation portion 151, air is sucked into the second ventilation portion 152 from the outside of the protruding portion 15 to generate air flow. The air flow passes through the second ventilation portion 152 and flows into the first ventilation portion 151, and then, flows from the lower opening 150 to the lower side of the base portion 14. When the pressure of the first ventilation portion 151 is higher than the pressure outside the protruding portion 15, air is sucked from the lower opening 150 to generate air flow in the first ventilation portion 151. The air flow generated in the first ventilation portion 151 flows into the second ventilation portion 152. The air flow passes through the second ventilation portion 152 and flows to the outside of the protruding portion 15.

The pressure difference between the outside of the protruding portion 15 and the first ventilation portion 151 is generated by, for example, the air flow caused by the rotation of the impeller 20. Then, the air flow passes through the outer wall recess 143 provided in the outer wall 142. When the outer wall recess 143 is large, the air flow generated by the impeller 20 is likely to flow inside the outer wall 142. As a result, the pressure outside the protruding portion 15 becomes higher than the pressure of the first ventilation portion 151. On the other hand, when the outer wall recess 143 is small, the air inside the outer wall 142 is pulled by the air flow generated by the impeller 20. As a result, the pressure of the first ventilation portion 151 becomes higher than the pressure outside the protruding portion 15. Note that there is also a case in which a pressure difference is generated due to a factor other than the size of the gap.

The air flow passing through the first ventilation portion 151 and the second ventilation portion 152 cools the stator holding portion 16 regardless of the flow direction. Accordingly, the heat generated in the coil portion 113 with driving of the motor 10 and transmitted to the stator core 111, and the heat generated in the stator core 111 are efficiently released to the outside. That is, a temperature rise of the stator 11 can be suppressed. As a result, an input (a current or a voltage) supplied to the coil portion 113 can be increased.

The stator holding portion 16 is formed using a member having thermal conductivity, and heat of the stator 11 is easily transmitted. Since the air flowing through the first ventilation portion 151 and the second ventilation portion 152 cools the stator holding portion 16, the heat generated in the stator 11 can be transmitted to the base portion 14 side and the heat can be efficiently released.

Further, the circumferential positions of some of the slots 1111 of the stator 11 overlap with the circumferential position of the second ventilation portion 152. As described above, the slots 1111 communicate with each other in the axial direction. Therefore, the air having flowed through the slot 1111 is likely to flow into the first ventilation portion 151 via the second ventilation portion 152. Conversely, the air flow having flowed from the first ventilation portion 151 to the second ventilation portion 152 is likely to flow into the slot 1111. Accordingly, the release of heat from the stator holding portion 16 is promoted, and the stator core 111 and the coil portion 113 are effectively cooled.

Since the outer wall 142 is provided with the outer wall recess 143 as described above, the gap is formed between the radially outer edge of the circuit board 17 and the outer wall 142. For example, when air flow flows from the second ventilation portion 152 to the first ventilation portion 151, air flow that flows from the upper side to the lower side of the circuit board 17 is generated in this gap. Conversely, when air flow flows from the first ventilation portion 151 to the second ventilation portion 152, the air flow is generated in this gap from the lower side to the upper side of the circuit board 17. Accordingly, the circuit board 17 and the electronic components mounted on the circuit board 17 are efficiently cooled. Further, the air having flowed through the slot 1111 is likely to flow into the first ventilation portion 151 through the second ventilation portion 152 without being hindered by the circuit board 17. Conversely, the air flow having flowed from the first ventilation portion 151 to the second ventilation portion 152 is likely to flow into the slot 1111 without being hindered by the circuit board 17. Accordingly, the release of heat from the stator holding portion 16 is promoted, and the stator core 111 and the coil portion 113 are effectively cooled.

Further, the outer wall 142 includes the outer wall recess 143 whose circumferential position overlaps with the circumferential position of the second ventilation portion 152. Therefore, a flow resistance of air flow flowing along the circuit board 17 is reduced, and a flow rate of the air flow can be increased. Accordingly, the cooling efficiency of the motor 10 can be further increased by the air flow.

Since the circuit board 17 is provided with the board hole 171, when the air flow flowing from the second ventilation portion 152 to the first ventilation portion 151 or the air flow flowing from the first ventilation portion 151 to the second ventilation portion 152 is generated, the air flow can be made to flow onto both the upper and lower surfaces of the circuit board 17. Accordingly, the circuit board 17 and the electronic components mounted thereon can be cooled more effectively. Further, the circuit board 17 includes the board hole 171 whose circumferential position overlaps with the circumferential position of the second ventilation portion 152. Thus, the air flow passing through the second ventilation portion 152 is likely to pass through the board hole 171, and the circuit board 17 and the electronic components mounted thereon can be even more effectively cooled.

As described above, the motor 10 can be cooled even from the center side with the simple configuration including the first ventilation portion 151 and the second ventilation portion 152 in the fan motor A. Therefore, the cooling effect is higher than a case in which the motor 10 is cooled by air only from the outside. That is, a temperature rise during driving is suppressed in the motor 10. Therefore, it is possible to increase the input (current or voltage) and to improve pressure-flow rate characteristics (P-Q characteristics) in the fan motor A according to the example embodiment.

Further, the temperature rise of the motor 10 can be suppressed in the state of maintaining the predetermined P-Q characteristics with a constant input. Therefore, it is possible to suppress deterioration of the bearing 12 (mainly the lubricating fluid), the magnet 134, and the like, which are likely to deteriorate due to temperature rise, and to extend the life of the fan motor A.

Figure 7:
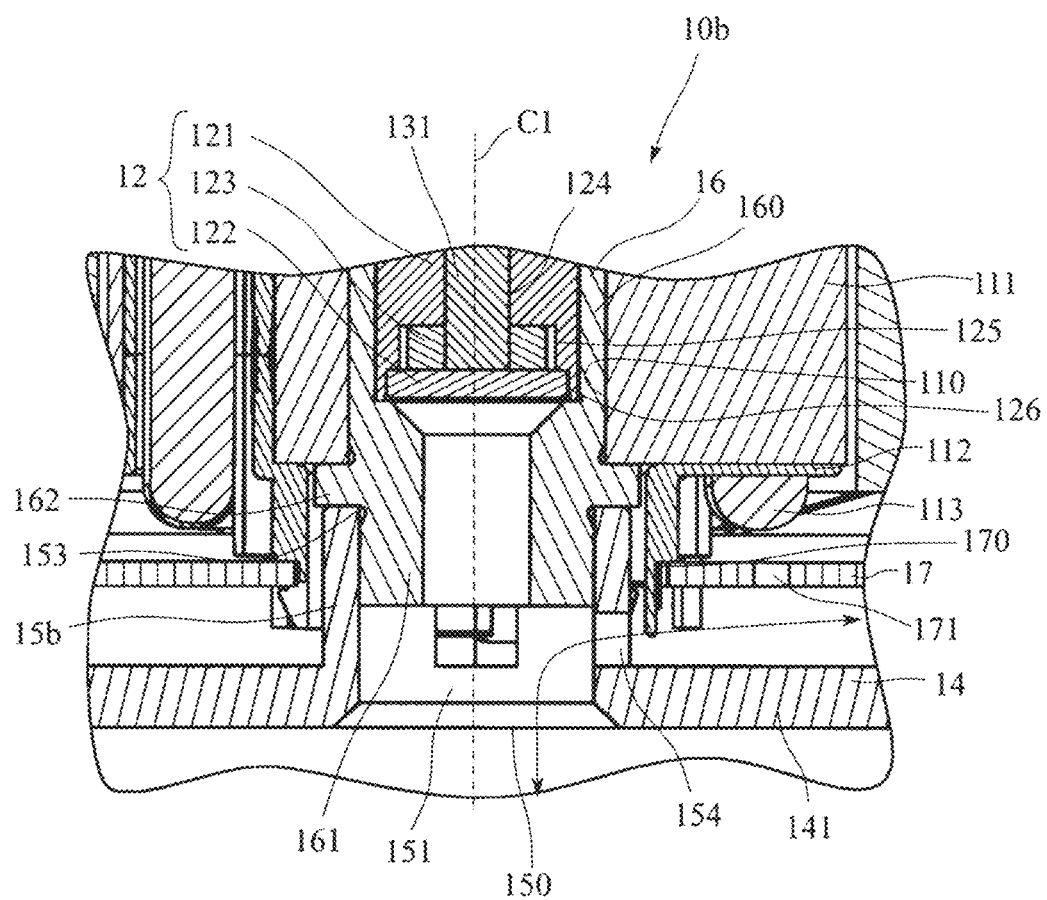
FIG. 7 is an enlarged cross-sectional view of a motor having another configuration according to an example embodiment of the present disclosure.

A modification of the motor according to the example embodiment will be described with reference to the drawing. FIG. 7 is an enlarged cross-sectional view of a motor 10*b* having another configuration of the example embodiment. In the motor 10*b* illustrated in FIG. 7, a second ventilation portion 154 of a protruding portion 15*b* is different from the second ventilation portion 152 of the protruding portion 15. The other configurations of the motor 10*b* are the same as those of the motor 10. Accordingly, portions of the motor 10*b* substantially equivalent to those of the motor 10 are denoted by the same reference signs, and detailed descriptions of such portions will be omitted.

As illustrated in FIG. 7, the protruding portion 15*b* of the motor 10*b* includes the second ventilation portion 154. The second ventilation portion 154 has a through-hole shape that penetrates through the protruding portion 15*b* in the radial direction. That is, the second ventilation portion 154 is a through-hole that penetrates through the protruding portion 15*b* in the radial direction. A lower end of the stator holding portion 16 is located above the second ventilation portion 154. Therefore, the second ventilation portion 154 communicates with the first ventilation portion 151. Accordingly, air flow passes through the first ventilation portion 151 and the second ventilation portion 152, and the motor 10*b* can be cooled from the inside.

Since the second ventilation portion 154 is formed in the through-hole shape, a part of the protruding portion 15*b* above the second ventilation portion 154 has an annular shape, that is, a shape continuous in the circumferential direction. Accordingly, it is possible to increase a pressure input, for example, when the stator holding portion 16 is press-fitted into the protruding portion 15b, and the stator holding portion 16 and the protruding portion 15b can be more firmly fixed. Since the strength of an upper end of the protruding portion 15b can be increased, the fixing strength between the stator holding portion 16 and the protruding portion 15b can be further increased by a fixing method other than press-fitting. Note that the protruding portion 15b may include a plurality of the second ventilation portions 154 similarly to the protruding portion 15, or may include the single second ventilation portion 154 having a certain length in the circumferential direction.

Figure 8:
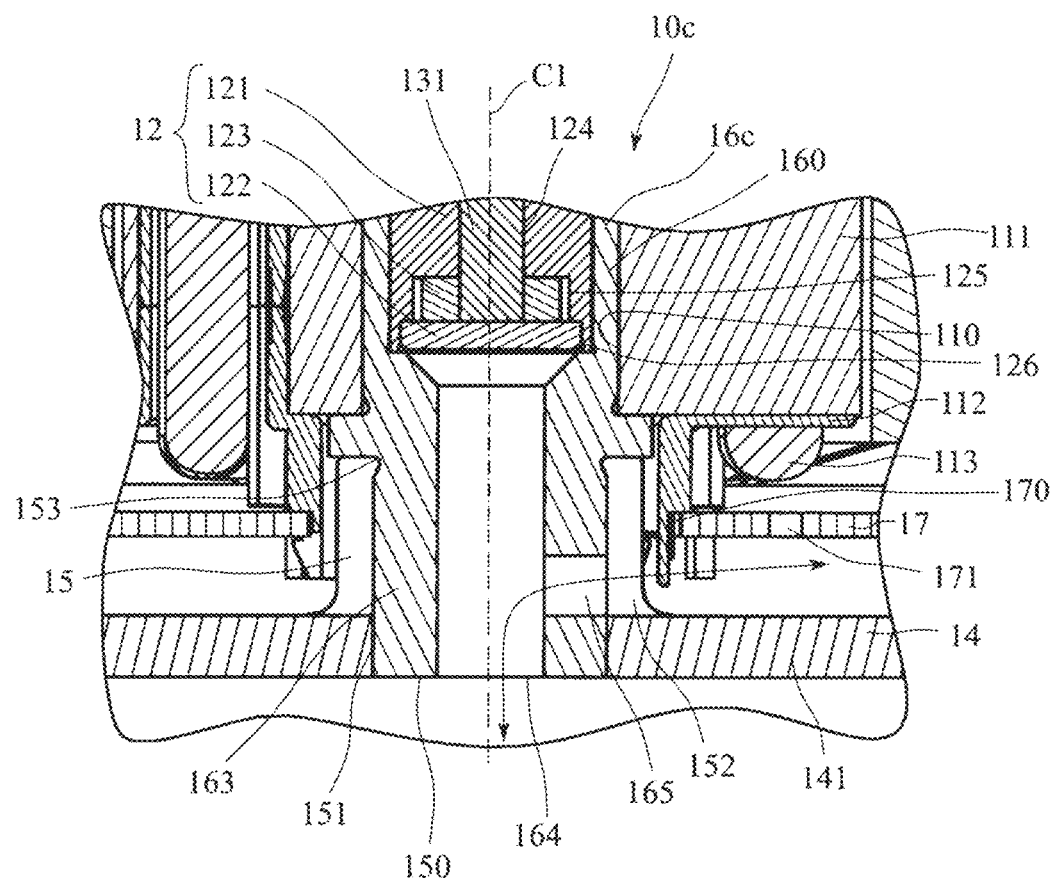
FIG. 8 is an enlarged cross-sectional view of a motor having still another configuration according to an example embodiment of the present disclosure.

Another modification of the motor according to the example embodiment will be described with reference to the drawing. FIG. 8 is an enlarged cross-sectional view of a motor 10c having still another configuration of the example embodiment. In the motor 10c illustrated in FIG. 8, a configuration of a stator holding portion 16c is different from that of the stator holding portion 16. The other configurations of the motor 10c are the same as those of the motor 10. Accordingly, portions of the motor 10c substantially equivalent to those of the motor 10 are denoted by the same reference signs, and detailed descriptions of such portions will be omitted.

An insertion portion 163 has a tubular shape. As illustrated in FIG. 8, a lower end 164 of the insertion portion 163 reaches a lower end of the base portion 14 in the stator holding portion 16c. That is, the lower end 164 of the insertion portion 163 is inserted over the entire axial length of the protruding portion 15. Accordingly, the protruding portion 15 is reinforced by the insertion portion 163, and the rigidity of the protruding portion 15 increases. Since the rigidity of the protruding portion 15 increases, shaking of the center axis C1 is suppressed, and the rotational accuracy of the motor 10c can be increased.

Further, the insertion portion 163 is arranged inside the first ventilation portion 151 of the protruding portion 15. In other words, the inside of the tubular insertion portion 163 constitutes a part of the first ventilation portion 151. That is, the insertion portion 163 includes a holding through-hole 165 that is formed in a tubular shape having an opening at a lower end and is open on a circumferential wall. When the stator holding portion 16c is attached to the protruding portion 15, a circumferential position of the holding through-hole 165 overlaps with a circumferential position of the second ventilation portion 152.

That is, the holding through-hole 165 is in the state of communicating with the second ventilation portion 152. More specifically, the second ventilation portion 152 communicates with the inside of the insertion portion 163 that is a part of the first ventilation portion 151. The holding through-holes 165 as the many as the second ventilation portions 152 can be formed, but the present disclosure is not limited thereto. For example, the single holding through-hole 165 may be configured to overlap with the plurality of second ventilation portions 152 in the radial direction. It is possible to prevent the stator holding portion 16c from closing the second ventilation portion 152.

Accordingly, air having passed through the second ventilation portion 152 passes through the inside of the insertion portion 163 from the holding through-hole 165, passes through the first ventilation portion 151, and is released to the outside from the lower opening 150. Conversely, air having been sucked from the lower opening 150 passes through the insertion portion 163, that is a part of the first ventilation portion 151, and flows into the holding through-hole 165 and the second ventilation portion 152. An axial length of the insertion portion 163 is long, and the area in contact with air flowing through the first ventilation portion 151 is wide. Therefore, heat can be released more efficiently by the air flowing through the first ventilation portion and the second ventilation portion.

Figure 9:
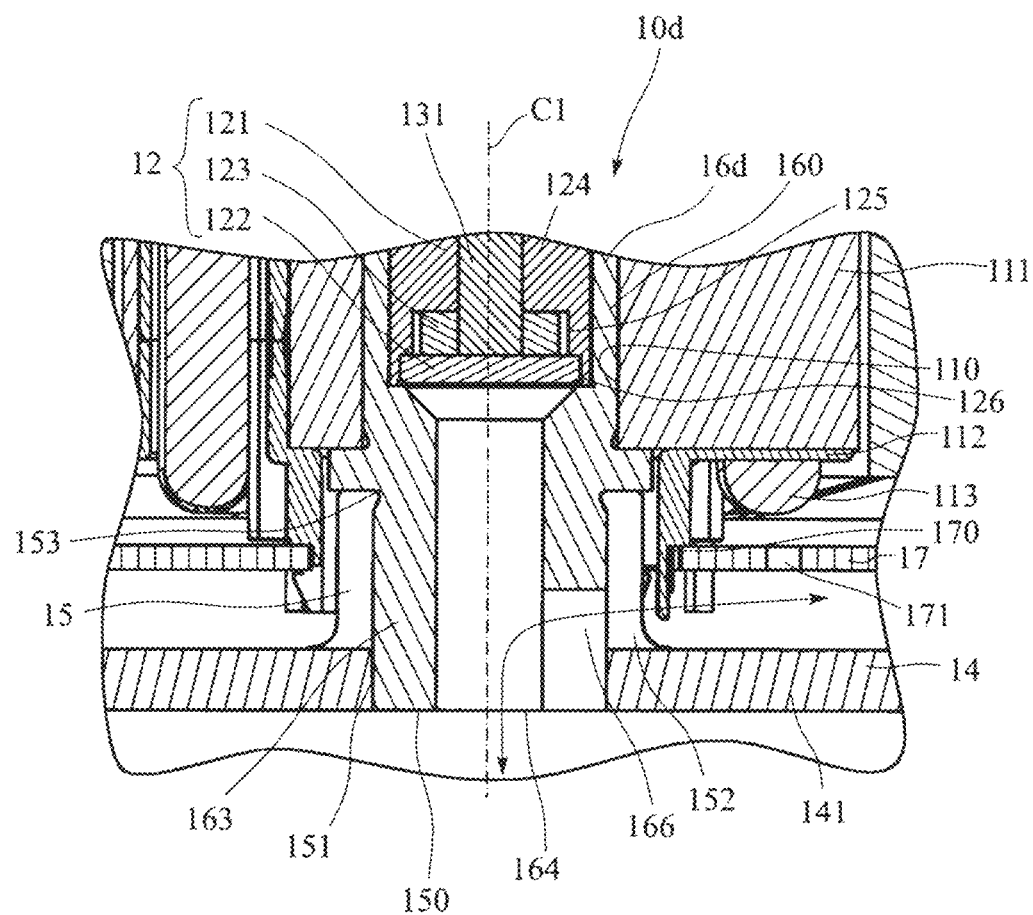
FIG. 9 is an enlarged cross-sectional view of a motor having still another configuration according to an example embodiment of the present disclosure.

Still another modification of the motor according to the example embodiment will be described with reference to the drawing. FIG. 9 is an enlarged cross-sectional view of a motor 10d having still another configuration of the example embodiment. In the motor 10d illustrated in FIG. 9, a stator holding portion 16d is different from the stator holding portion 16c in terms of including a holding recess 166 instead of the holding through-hole 165. The other configurations of the motor 10d are the same as those of the motor 10c. Accordingly, portions of the motor 10d substantially equivalent to those of the motor 10c are denoted by the same reference signs, and detailed descriptions of such portions will be omitted.

The insertion portion 163 has a tubular shape having an opening at a lower end. A circumferential position of the holding recess overlaps with a circumferential position of the second ventilation portion. As illustrated in FIG. 9, the insertion portion 163 of the stator holding portion 16d of the motor 10d includes the holding recess 166 that is recessed axially upward from the lower end 164. That is, the insertion portion 163 includes the holding recess 166 that is recessed axially upward from the lower end 164. The circumferential position of the holding recess 166 overlaps with the circumferential position of the second ventilation portion 152.

The holding recess 166 has the shape recessed from the lower end 164, and thus, can be easily manufactured. Therefore, manufacturing cost can be reduced. Since the lower end 164 of the insertion portion 163 is discontinuous in the circumferential direction, the lower end 164 of the insertion portion 163 is easily deformed. Therefore, the lower end 164 is easily inserted when being inserted from the upper opening 153 of the protruding portion 15. As a result, the assembly is easy.

The holding recess 166 is provided in the stator holding portion 16d, and the holding recess 166 is in the state of communicating with the second ventilation portion 152. Therefore, air having passed through the second ventilation portion 152 passes through the tubular inside of the stator holding portion 16d from the holding recess 166, passes through the first ventilation portion 151, and is released to the outside through the lower opening 150. Alternatively, air flows conversely. Accordingly, it is possible to prevent the stator holding portion 16d from closing the second ventilation portion 152. Therefore, the heat transmitted to the stator holding portion 16d can be efficiently released by the air flowing through the first ventilation portion 151 and the second ventilation portion 152.

Figure 10:
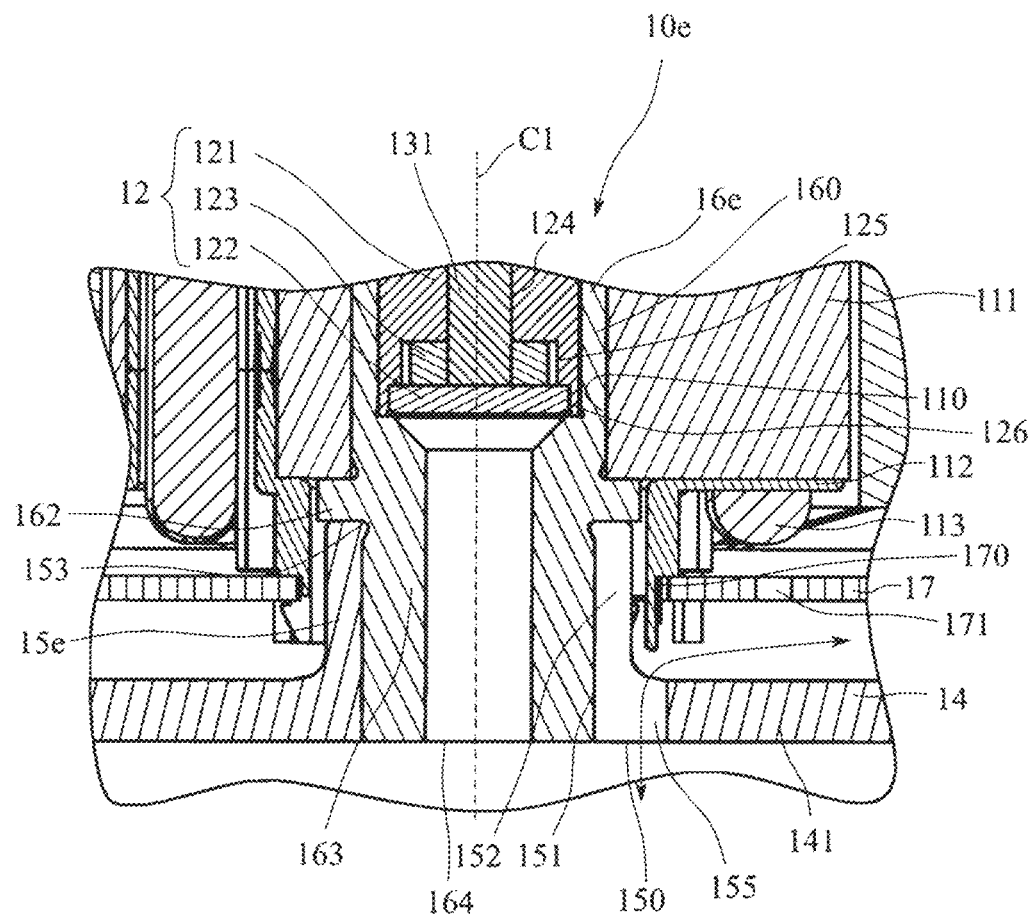
FIG. 10 is an enlarged cross-sectional view of a motor having still another configuration according to an example embodiment of the present disclosure.

Still another modification of the motor according to the example embodiment will be described with reference to the drawing. FIG. 10 is an enlarged cross-sectional view of a motor 10e having still another configuration of the example embodiment. In the motor 10e illustrated in FIG. 10, a protruding portion 15e and a stator holding portion 16e are different from the protruding portion 15 and the stator holding portion 16. The other configurations of the motor 10e are the same as those of the motor 10. Accordingly, portions of the motor 10e substantially equivalent to those of the motor 10 are denoted by the same reference signs, and detailed descriptions of such portions will be omitted.

As illustrated in FIG. 10, the motor 10e includes the protruding portion 15e and the stator holding portion 16e.

The lower end 164 of the insertion portion 163 reaches a lower end of the base portion 14 in the stator holding portion 16e. The insertion portion 163 has a tubular shape.

Figure 11:
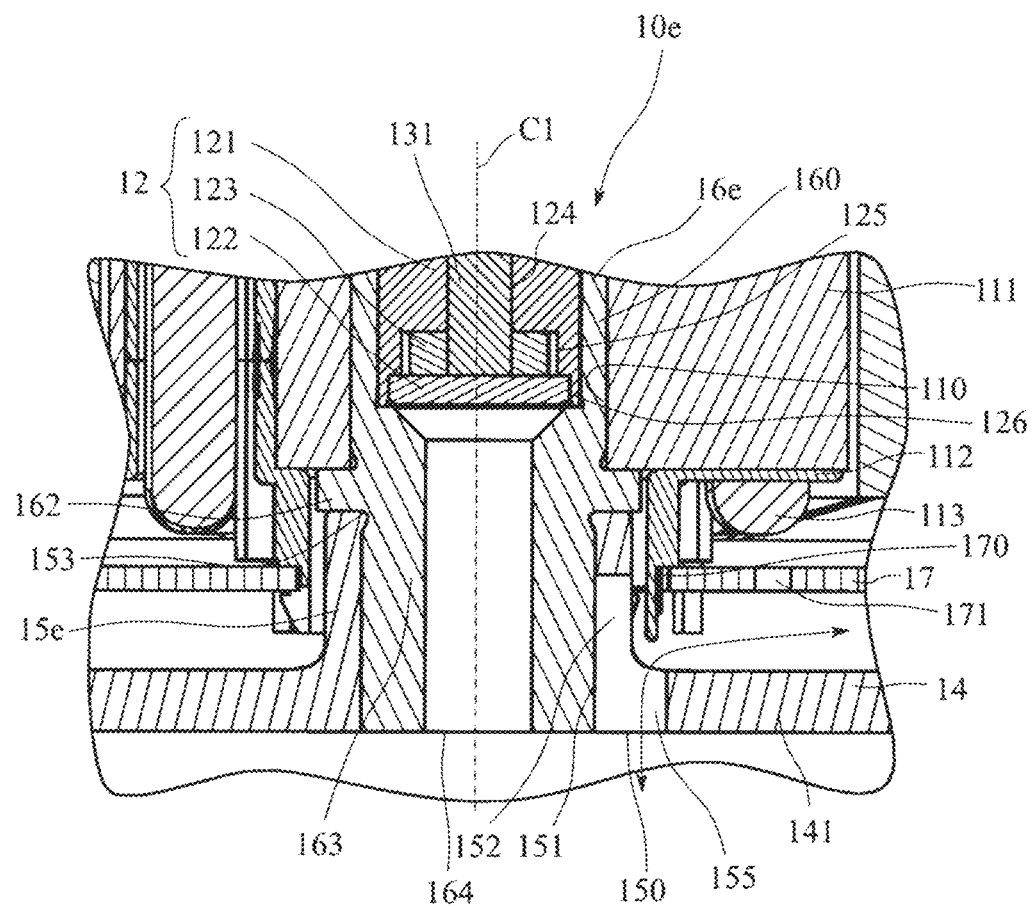
FIG. 11 is an enlarged cross-sectional view of a motor having still another configuration according to an example embodiment of the present disclosure.

The protruding portion 15e includes a concave groove 155, which is recessed radially outward, in a portion overlapping with the second ventilation portion 152 in the axial direction. The concave groove 155 is connected to the first ventilation portion 151. That is, the lower lid portion includes the concave groove that faces the first ventilation portion and is recessed in the radial direction. The second ventilation portion 152 is a recess that is recessed axially upward, and has a circumferential position overlapping with a circumferential position of the concave groove 155. In the present example, the second ventilation portion 152 is configured to be removed from a lower end to an upper end of the protruding portion 15e, but is not limited thereto. FIG. 11 an enlarged cross-sectional view of the motor 10e having still another configuration of the example embodiment. For example, as illustrated in FIG. 11, a configuration in which a part is removed from the lower end, that is, a shape in which the upper part of the second ventilation portion 152 of the protruding portion 15e is continuous in the circumferential direction may be used.

Therefore, the concave groove 155 is a part of the first ventilation portion 151. The concave groove 155 communicates with the second ventilation portion 152, and the lower end of the concave groove 155 is the lower opening 150. Therefore, even when the insertion portion 163 of the stator holding portion 16e is inserted over the entire length of the protruding portion 15e, the first ventilation portion 151 and the second ventilation portion 152 can be set to the communicating state.

As a result, the air flow flows through the first ventilation portion 151 and the second ventilation portion 152, and the heat of the motor 10e can be released from the inside. Since the first ventilation portion 151 and the second ventilation portion 152 are configured to open downward, an annular portion can be formed at the upper end of the protruding portion 15e with a mold that is open in the axial direction. Accordingly, the cost required for manufacturing can be reduced.

Figure 12:
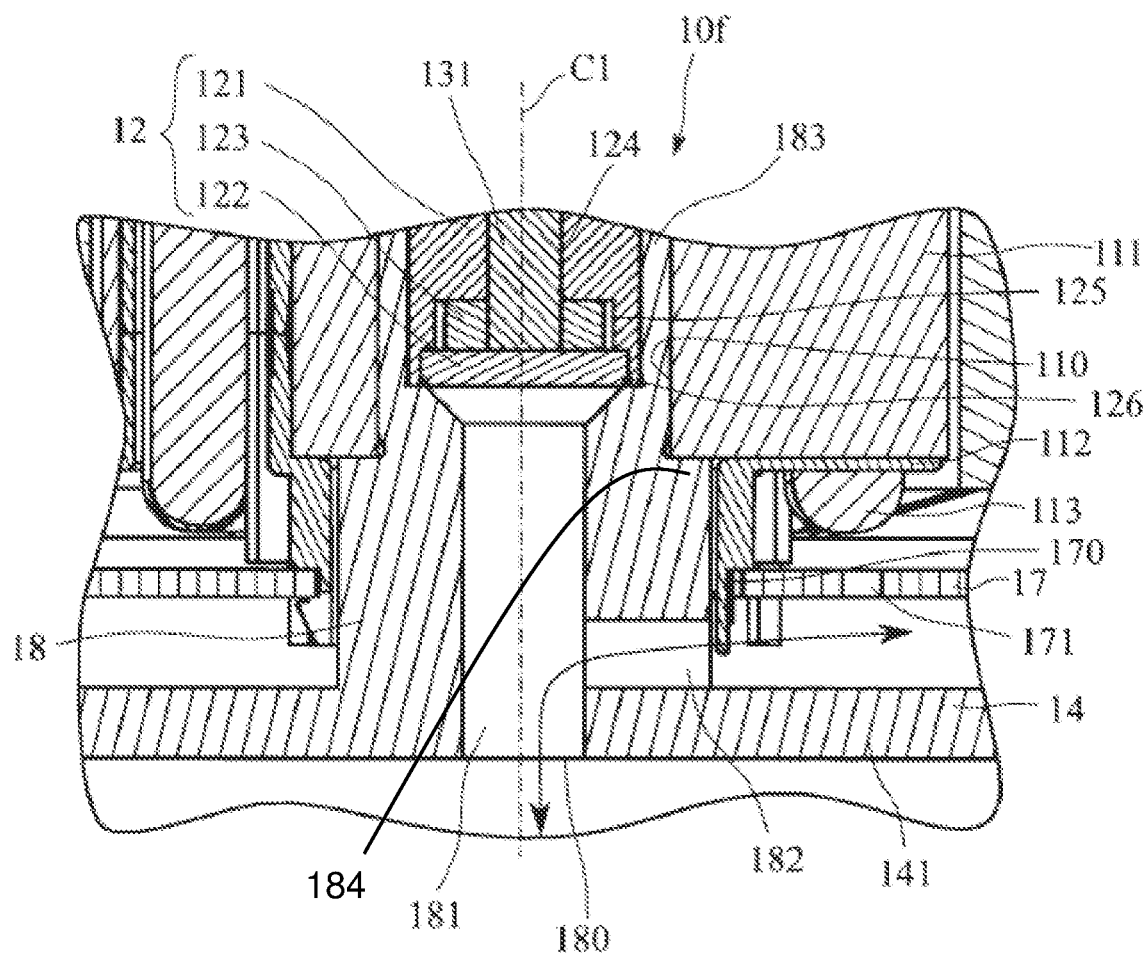
FIG. 12 is an enlarged cross-sectional view of a motor having still another configuration according to an example embodiment of the present disclosure.

Still another modification of the motor according to the example embodiment will be described with reference to the drawing. FIG. 12 is an enlarged cross-sectional view of a motor 10f having still another configuration of the example embodiment. The motor 10f illustrated in FIG. 12 includes a stator holding tubular portion 18 instead of the protruding portion 15 and the stator holding portion 16 of the motor 10. The other configurations of the motor 10f are the same as those of the motor 10. Accordingly, portions of the motor 10f substantially equivalent to those of the motor 10 are denoted by the same reference signs, and detailed descriptions of such portions will be omitted.

As illustrated in FIG. 12, the motor 10f is provided with the stator holding tubular portion 18 in which a protruding portion 184 and a stator holding portion 185 are integrally formed. In the stator holding tubular portion 18, a lower part is the protruding portion 184 and an upper part is the stator holding portion 183. That is, the protruding portion 184 and the stator holding portion 183 are formed as the same member.

The stator holding tubular portion 18 has a tubular shape and includes a first ventilation portion 181 therein. A lower end of the first ventilation portion 181 is a lower opening 180. The stator holding tubular portion 18 includes a second ventilation portion 182 that penetrates through the stator holding tubular portion 18 from a radially outer surface to the first ventilation portion 181. The second ventilation portion 182 communicates with the first ventilation portion 181. With this configuration, it is possible to cause air flow to flow through the first ventilation portion 181 and the second ventilation portion 182. Since the protruding portion 184 and the stator holding portion 185 are integrated in the stator holding tubular portion 18, the positional accuracy of a center axis can be easily obtained as compared with the case of separately forming the protruding portion and the stator holding portion. Accordingly, the cost required for manufacturing can be reduced. Note that the stator holding tubular portion 18 may be formed integrally with the base portion 14 or may be a separate body.

Although a shaft-rotating motor in which a shaft held by a bearing rotates together with a rotor is used in the above-described respective examples, but the present disclosure is not limited thereto. A shaft-fixed motor in which a shaft is fixed together with a stator and a sleeve rotates with respect to the shaft may be used. In this case, a rotor is configured to rotate together with the sleeve.

Although the description has been given in the above-described respective examples using the fluid dynamic pressure bearing as the bearing, the present disclosure is not limited thereto. For example, bearings having a configuration capable of rotatably supporting a shaft or a rotor, such as a sliding bearing and a ball bearing, can be widely used.

Further, the motor according to the present disclosure can be widely adopted not only as the fan motor but also as a power source.

The fan motor of the present disclosure can be used for an air blower to be used for cooling of an electric device or the like.

Further, the motor of the present disclosure can be used as a power source, which supplies a rotational force to the outside, other than the fan motor.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a rotor supported by a bearing and rotatable about a center axis that extends vertically;
   a stator including a tubular inner circumferential surface and opposing the rotor in a radial direction;
   a base portion opposing a lower surface of the stator in an axial direction; and
   a circuit board between the base portion and the stator in the axial direction; wherein the base portion includes:
   a lower lid portion expanding in a direction orthogonal or substantially orthogonal to the center axis;
   a protruding portion protruding in the axial direction from an upper surface at a center of the lower lid portion; and
   a stator holding portion adjacent to the protruding portion in the axial direction and contactable with the inner circumferential surface of the stator; the protruding portion includes:
   a first ventilation portion opening downward at the center of the lower lid portion;
   a second ventilation portion to cause a radially outer side of the protruding portion to communicate with the first ventilation portion; and at least a portion of the stator holding portion opposes the first ventilation portion or the second ventilation portion;

the base portion further includes an outer wall extending axial upward from a radially outer edge of the lower lid portion;

a radial gap is provided at least in a portion between a radially outer edge of the circuit board and the outer wall;

the outer wall includes an outer wall recess that recessed axially downward from an upper end of the outer wall; and at least a portion of the outer wall recess overlaps with a circumferential position of the second ventilation portion.

2. The motor according to claim 1, wherein the protruding portion and the stator holding portion are both portions of a single part.

3. The motor according to claim 1, wherein
the stator holding portion is defined by a separate member from the protruding portion;
the stator holding portion is defined by a heat conductor;
the protruding portion includes an upper opening located at an upper end and opening upward; and
the stator holding portion includes an insertion portion located at a lower end and insertable into the upper opening.

4. The motor according to claim 3, wherein a lower end of the insertion portion is positioned above an axially lower end of the second ventilation portion.

5. The motor according to claim 3, wherein
the insertion portion includes a holding through-hole that is tubular and includes an opening at a lower end that opens on a circumferential wall; and
a circumferential position of the holding through-hole overlaps with a circumferential position of the second ventilation portion.

6. The motor according to claim 3, wherein
the insertion portion includes a holding recess that is tubular and includes an opening at a lower end and recessed axially upward from the lower end; and
a circumferential position of the holding recess overlaps with a circumferential position of the second ventilation portion.

7. The motor according to claim 3, wherein the second ventilation portion is recessed axially downward from the upper end of the protruding portion.

8. The motor according to claim 1, wherein the second ventilation portion is a through-hole which penetrates through the protruding portion in the radial direction.

9. The motor according to claim 1, wherein
the stator includes:
a stator core including the inner circumferential surface; and
an insulator covering at least a portion of the stator core;
the insulator includes a cover portion which opposes an outer surface of the protruding portion in the radial direction;
the cover portion includes a plurality of through portions that penetrate through the cover portion in the radial direction; and
at least one circumferential position of the through portions overlaps with the circumferential position of the second ventilation portion.

10. The motor according to claim 1, wherein a circumferential position of at least a portion of the radial gap overlaps with the circumferential position of the second ventilation portion.

11. The motor according to claim 1, wherein the circuit board includes a plurality of board holes which penetrate through the circuit board in the axial direction.

12. The motor according to claim 11, wherein at least one circumferential position of the board holes overlaps with the circumferential position of the second ventilation portion.

13. The motor according to claim 1, wherein
the stator includes a plurality of slots; and
circumferential positions of at least some of the plurality of slots overlap with the circumferential position of the second ventilation portion when viewed in the axial direction.

14. A fan motor comprising:
the motor of claim 1;
an impeller fixed to the rotor and rotates together with the rotor; and
a housing that houses the motor and the impeller.

* * * * *